(12) United States Patent
Motoyama

(10) Patent No.: US 7,895,896 B2
(45) Date of Patent: Mar. 1, 2011

(54) PRESSURE SENSOR

(75) Inventor: Hisao Motoyama, Minamisoma (JP)

(73) Assignee: Epson Toyocom Corporation (JP)

( * ) Notice: Subject to any disclaimer, the term of this patent is extended or adjusted under 35 U.S.C. 154(b) by 55 days.

(21) Appl. No.: 12/480,226

(22) Filed: Jun. 8, 2009

(65) Prior Publication Data

US 2009/0308164 A1 Dec. 17, 2009

(30) Foreign Application Priority Data

Jun. 11, 2008 (JP) ................................ 2008-153257
Feb. 9, 2009 (JP) ................................ 2009-027765

(51) Int. Cl.
*G01L 9/06* (2006.01)

(52) U.S. Cl. .............................................. 73/721; 73/727

(58) Field of Classification Search .................. None
See application file for complete search history.

(56) References Cited

U.S. PATENT DOCUMENTS

| | | |
|---|---|---|
| 4,215,570 A | 8/1980 | EerNisse |
| 4,309,908 A | 1/1982 | Rapp et al. |
| 4,321,500 A | 3/1982 | Paros et al. |
| 4,372,173 A | 2/1983 | EerNisse et al. |
| 4,382,385 A | 5/1983 | Paros |
| 4,384,495 A | 5/1983 | Paros |
| 4,406,966 A | 9/1983 | Paros |
| 4,455,874 A | 6/1984 | Paros |
| 6,497,152 B2 | 12/2002 | Paros et al. |
| 6,595,054 B2 | 7/2003 | Paros et al. |
| 6,813,960 B1 * | 11/2004 | Owen et al. ................ 73/808 |
| 7,024,934 B2 * | 4/2006 | Yu ............................... 73/514.37 |
| 7,467,553 B2 * | 12/2008 | Meyer ......................... 73/514.29 |
| 2009/0241679 A1 * | 10/2009 | Motoyama ....................... 73/717 |
| 2009/0308167 A1 * | 12/2009 | Motoyama ....................... 73/717 |
| 2009/0308168 A1 * | 12/2009 | Motoyama ....................... 73/717 |
| 2010/0224003 A1 * | 9/2010 | Watanabe et al. ............... 73/717 |

FOREIGN PATENT DOCUMENTS

| | | |
|---|---|---|
| JP | 56-119519 | 9/1981 |
| JP | 64-009331 | 1/1989 |
| JP | 64-086608 | 3/1989 |
| JP | 02-228534 | 9/1990 |
| JP | 07-019981 | 1/1995 |
| JP | 08-159900 | 6/1996 |
| JP | 2004-347387 | 12/2004 |
| JP | 2005-017050 | 1/2005 |
| JP | 2005-121628 | 5/2005 |
| JP | 2006-194736 | 7/2006 |
| JP | 2007-057395 | 3/2007 |
| JP | 2007-132697 | 5/2007 |
| JP | 2008-232886 | 10/2008 |

\* cited by examiner

*Primary Examiner* — Andre J Allen
(74) *Attorney, Agent, or Firm* — Harness, Dickey & Pierce, P.L.C.

(57) ABSTRACT

A pressure sensor includes a housing, a pressure input orifice opened on a pipe sleeve formed on the housing, a diaphragm that seals the pressure input orifice and has one face as a pressure receiving face, a force transmitting unit connected to a central area of the other face of the diaphragm in the housing, and a pressure sensitive element whose detection direction of a force is a detection axis. A displacement direction and the detection axis of the force transmitting unit are roughly orthogonal to the pressure receiving face. One end and the other end of the pressure sensitive element are respectively fixed to the housing and the force transmitting unit with an adhesive therebetween, and the adhesive is an inorganic adhesive.

15 Claims, 6 Drawing Sheets

HYSTERESIS CHARACTERISTIC OF PRESSURE
SENSOR USING EPOXY TYPE ADHESIVE

HYSTERESIS CHARACTERISTIC OF PRESSURE
SENSOR USING INORGANIC ADHESIVE

PRESSURE SENSOR

BACKGROUND

1. Technical Field

The present invention relates to a pressure sensor, and in particular to a pressure sensor that does not use oil as a pressure receiving medium and relates to a technique for reducing an error in detection of a pressure caused by a support part of a pressure sensitive element.

2. Related Art

Pressure sensors that use a piezoelectric resonator as a pressure sensitive element are known as a water pressure gauge, an air gauge, and a differential pressure gauge. The piezoelectric resonator is configured, for instance, such that an electrode pattern is formed on a planar piezoelectric substrate, and a detection axis is set to a direction of detecting a force. When pressure is applied in the direction of the detection axis, a resonance frequency of the piezoelectric resonator is varied so that the pressure is detected on the basis of the variation in the resonance frequency. JP-A-56-119519, JP-A-64-9331, and JP-A-2-228534, as first, second, and third examples, of the related art disclose a pressure sensor including a piezoelectric resonator as a pressure sensitive element. When a pressure is applied to bellows from a pressure input orifice, a force F corresponding to an effective area of the bellows is transmitted to the piezoelectric resonator as a compressive force or a tensile force through a force transmitting unit that has a pivot as a fulcrum (a flexible hinge). A stress corresponding to the force F is generated in the piezoelectric resonator and the stress causes the resonance frequency to be varied. The pressure sensor is adapted to measure a pressure by detecting variation in the resonance frequency appearing in the piezoelectric resonator.

An existing pressure sensor is described below with reference to the first example of the related art. FIGS. 8A and 8B are schematic views typically illustrating a structure of a related art pressure sensor. A pressure sensor 501 according to the related art shown in FIG. 8A includes a housing 504 having first and second pressure input orifices 502 and 503 that are arranged to face each other, and a force transmitting member 505 disposed inside the housing 504. The force transmitting member 505 is coupled to a first bellows 506 and a second bellows 507 such that one end of the force transmitting member 505 is sandwiched between one end of the first bellows 506 and one end of the second bellows 507. The other end of the first bellows 506 is coupled to the first pressure input orifice 502 so that a pressure to be measured can be introduced to the inside, and the other end of the second bellows 507 is coupled to the second pressure input orifice 503 so that an atmospheric air pressure can be introduced to the inside. In addition, a double-ended tuning fork resonator 509 serving as a pressure sensitive element is disposed between the other end of the force transmitting member 505 and an end of a substrate 508 at an opposite side from a pivot (fulcrum).

Here, regarding the pressure sensor, the bellows at a detection side is filled with a liquid so as to detect a pressure with high precision. In general, oil such as silicon oil having high viscosity is used as the liquid, in order to prevent bubbles from entering and accumulating inside the bellows or between the folds of the bellows.

Thus, the interior of the first bellows 506 is filled with oil 510 having high viscosity. In a case where an object for pressure measurement is a liquid, the oil 510 is brought into contact with the liquid via an opening 511 formed at the first pressure input orifice 502 to face with the liquid. Here, a diameter of the opening 511 is set so that the oil 510 does not leak out.

In the pressure sensor 501 having the above structure, when the pressure F is applied to the oil 510 stored in the first bellows 506 from the liquid as the object for pressure measurement, the pressure F is applied to the one end of the force transmitting member 505 via the first bellows 506. At the same time, the atmospheric pressure is applied to the second bellows 507 and a force equivalent to the atmospheric pressure is applied to the one end of the force transmitting member 505.

As a result, a force equivalent to a differential pressure is applied through the other end of the force transmitting member 505 to the double-ended tuning fork resonator 509 as a compressive force or a tensile force with a pivot of the substrate 508 as a fulcrum point, the differential pressure being a difference between the atmospheric pressure and the pressure F applied by the liquid as the pressure measurement object. Due to the compressive force or the tensile force applied to the double-ended tuning fork resonator 509, a stress is generated in the resonator 509. In accordance with a magnitude of the stress, the resonance frequency of the resonator 509 is varied. Therefore, measurement of the resonance frequency enables detection of the magnitude of the pressure F.

JP-A-2005-121628, as a fourth example of the related art, discloses a pressure sensor having a structure that does not include an expensive force transmitting unit (cantilever) having a swing arm using a pivot (flexible hinge) as a fulcrum which is used in the above described pressure sensor. In the sensor, two bellows are straightly aligned in a sensor housing in a manner sandwiching a pedestal therebetween. The sensor detects pressure variation generated by an action of the pedestal caused by the difference between pressures applied to the respective bellows. Therefore, a resonator bonding pedestal is sandwiched between one end of the first bellows and one end of the second bellows. A pressure sensitive element is provided at an outer periphery side of the second bellows, and ends of the pressure sensitive element are fixed to the pedestal and to a housing wall positioned at the other end side of the second bellows. In addition, a reinforcing plate is disposed at an axisymmetrical position to the pressure sensitive element with the second bellows interposed. The ends of the reinforcing plate are fixed to the pedestal and the housing wall, respectively.

JP-A-2007-57395 as a fifth example of the related art discloses a pressure sensor including a reinforcing elastic member (spring) that couples a pedestal to a housing in a direction orthogonal to a direction of a pressure detection axis of bellows. The reinforcing elastic member is provided so as to solve such a problem that the sensor disclosed in the fourth example has insufficient strength with respect to a shock applied from a direction orthogonal to the direction of the pressure detection axis of the bellows.

JP-A-2006-194736 and JP-A-2007-132697 as sixth and seventh examples of the related art disclose a pressure sensor that is used by being fixed to an engine block so as to detect a hydraulic pressure inside an engine. The pressure sensor includes a sensing unit that outputs an electric signal corresponding to an applied pressure, a pressure-receiving diaphragm unit that receives a pressure, and a pressure transmitting member for transmitting the pressure from the diaphragm unit to the sensing unit. Specifically, a first diaphragm for reception of a pressure and a second diaphragm for detection are respectively provided to end faces of a hollow metal stem. A force transmitting member is interposed between the first diaphragm and the second diaphragm in the stem. The force transmitting member is a shaft made of metal or ceramic, and is interposed between the pair of diaphragms in a prestressed fashion. Further, a chip with a functionality of a strain gauge (strain gauge chip) is attached to an outer end face of the second diaphragm as a pressure detection element. The force transmitting member transmits a pressure received by the first diaphragm to the second diaphragm, and deformation of the second diaphragm is converted into an electronic signal by the strain gauge chip, thereby detecting the hydraulic pressure of the engine.

In the first to third examples, the first bellows 506 is filled with the oil 510 as the pressure sensor 501 shown in FIG. 8. The oil 510 has a thermal expansion coefficient higher than that of any other elements that constitute the pressure sensor 501, such as the force transmitting member 505 and the double-ended tuning fork resonator 509. As a result, thermal distortion occurs in the components constituting the pressure sensor due to a temperature change. Such thermal distortion acts on the double-ended tuning fork resonator 509 as unnecessary stress, resulting in inducing of an error in a measured pressure value and degradation of characteristics of the pressure sensor.

Moreover, since the oil 510 stored in the first bellows 506 contacts and faces a liquid that is an object for pressure measurement, the oil 510 may flow into the liquid, or the liquid may flow into the first bellows 506 depending on an installation way of the pressure sensor. This may cause bubbles to be generated inside the oil 510 stored in the first bellows 506. If bubbles are generated in the oil 510 serving as a pressure transmitting medium, a force cannot be stably transmitted to the double-ended tuning fork resonator 509 through the force transmitting member 505, possibly resulting in inducing of an error in a measured pressure value.

Further, as described above, since the oil 510 contacts and faces the liquid that is an object for pressure measurement, the oil 510 may flow into the liquid depending on an installation way of the pressure sensor. Therefore, an existing pressure sensor using the oil 510 according to the related art is not able to be applicable to measurement of a pressure of a pure liquid that dislikes foreign substances.

Furthermore, the pressure sensor 501 of the related art includes the force transmitting member 505 having a complicated structure, resulting in difficulties in miniaturizing of the pressure sensor. In addition, the force transmitting member 505 requires a flexible hinge having a slim constriction so as to be an expensive component, thereby disadvantageously increasing the manufacturing cost of the pressure sensor.

Furthermore, the pressure sensor 501 of the related art includes the cantilever type force transmitting member 505 having a complicated structure, resulting in difficulties in miniaturizing of the pressure sensor. In addition, the force transmitting member 505 requires a flexible hinge having a slim constriction so as to be an expensive component, thereby disadvantageously increasing the manufacturing cost of the pressure sensor.

When the pressure sensor of the fourth and fifth examples of the related art inclines, the bellows may droop. As a result, a force applied to the pressure sensitive element (double-ended tuning fork resonator) varies, resulting in variation in a resonance frequency.

In addition, the pressure sensor has a structure that one end of a pipe filled with oil is connected to a pressure introduction orifice of the pressure sensor and the other end of the pipe is brought into contact with a liquid that is an object for pressure measurement. As a result, the oil stored in the bellows or the pipe contacts and faces the liquid that is an object for pressure measurement, as described in the first to third examples.

Further, the pressure sensor has a structure that one end of a pipe filled with oil is connected to a pressure introduction orifice of the pressure sensor and the other end of the pipe is brought into contact with a liquid that is a measurement object. As a result, the oil stored in the bellows or the pipe contacts and faces the liquid that is an object for pressure measurement, as described in the first to third examples. Since the oil may flow into the liquid as the object for pressure measurement or the liquid may flow into the bellows depending on an installation way of the pressure sensor, bubbles may be generated in the oil stored in the bellows. If bubbles are generated in the oil, the oil functioning as a transmission medium of pressure cannot stably transmit a force through the pedestal to the double-ended tuning fork resonator, resulting in an error in the pressure measurement.

The pressure sensor of the fifth example of the related art has a structure that the pedestal sandwiched by the bellows is supported by the reinforcing elastic member made of a plate string provided at the side face of the housing. With the above configuration, it is possible to generate a force suppressing an action of the pedestal along with movement of the bellows in the direction of the axis. As a result, the pressure detection sensitivity may be deteriorated. If the reinforcing elastic member is hardened for its firm support, the movement of the bellows is suppressed, resulting in deterioration of the pressure detection sensitivity.

Further, in the fourth and fifth examples, since the reinforcing plate is disposed at an axisymmetrical position to the pressure sensitive element with the bellows interposed, the movement of the bellows is suppressed, resulting in deterioration of the pressure detection sensitivity.

In the sixth and seventh examples of the related art, the diaphragm and the shaft are in contact with each other in the prestressed fashion. The pressure sensor is used at a high temperature in a high pressure. With the above configuration, if the diaphragm and the shaft are rigidly fixed, the mechanism may be broken by the difference between thermal expansions of the components. In consideration of the thermal expansions, the diaphragm and the shaft are only in point contact with each other, and are not bonded by an adhesive. As a result, there is a very high possibility that the point contact position deviates when the diaphragm and the shaft operate by the pressure variation. If the point contact portion deviates, a force acting on both of the diaphragm and the shaft is dispersed, resulting degradation of precision in pressure detection. Moreover, in the sixth and seventh examples of the related art, the pressure sensor is generally used at a high temperature in a high pressure. Therefore, it is desirable that the force transmitting member be as long as possible by creating a distance between the pressure receiving unit and the sensing unit in order to avoid thermal influence to the components such as the chip of the sensing unit. Thus, the sensor described in the examples is not suitable for miniaturization. In addition, in the case of the sixth and seventh examples of the related art, transmission of a force is carried out by interposing a shaft between a pair of diaphragms. However, since the sensor chip is attached to the diaphragm in the sensing unit, the properties of the diaphragms respectively provided to the pressure receiving unit and the sensing unit differ from each other, resulting in a problem that the measurement accuracy cannot be improved.

SUMMARY

An advantage of the present invention is to provide a pressure sensor that can be manufactured in a good yield, can be miniaturized, and can have high sensitivity and high precision.

In particular, another advantage of the invention is to provide a pressure sensor that does not use oil as a pressure receiving medium, and is configured such that an elastic action on a coupling part in an attachment part of a pressure sensitive element does not lower the sensitivity of the pressure sensitive element by making the attachment part to be in rigid coupling.

A pressure sensor according to a first aspect of the invention includes: a housing; a pressure input orifice opened on a pipe sleeve formed on the housing; a diaphragm that seals the pressure input orifice and has one face as a pressure receiving face; a force transmitting unit connected to a central area of the other face of the diaphragm in the housing; and a pressure sensitive element whose detection direction of a force is a detection axis. A displacement direction of the force transmitting unit and the detection axis are roughly orthogonal to the pressure receiving face, one end and the other end of the pressure sensitive element are respectively fixed to the housing and the force transmitting unit with an adhesive therebetween. The adhesive is an inorganic adhesive.

With the above configuration, adhesive layers of the inorganic adhesive are respectively formed between the pressure sensitive element and the housing, and between the pressure sensitive element and the force transmitting unit. A pressure received by the diaphragm is applied to the pressure sensitive element via the force transmitting unit as a compressive force or a tensile force, and then a shear stress is applied to the adhesive layer in a direction parallel to an adhering face of the adhesive layer. Accordingly, since the adhesive layer is formed to be rigid by the inorganic adhesive, the shear stress is not absorbed nor alleviated and is surely transmitted to the pressure sensitive element so that it is possible to form the highly precise pressure sensor capable of improving accuracy of pressure detection while eliminating an error in the pressure detection.

In the pressure sensor according to the first aspect of the invention, the inorganic adhesive may include aluminum oxide and a Si compound. Since the thermal expansion coefficient of the inorganic adhesive is roughly equal to that of the piezoelectric element such as quartz crystal, it is possible to form the pressure sensor having an excellent thermal characteristic.

In the pressure sensor according to the first aspect of the invention, the piezoelectric element may have base portions provided to its respective ends and an oscillation part disposed between the base portions.

With the above configuration, the piezoelectric element has the resonant frequency having a markedly large variable range with respect to an expansion or contraction stress. As a result, it is possible to form the pressure sensor superior in resolution so as to detect a fine pressure difference.

A pressure sensor according to a second aspect of the invention includes: a housing having a pressure input orifice; a diaphragm that seals the pressure input orifice and has a pressure receiving face at its outer face; a force transmitting unit that is connected to a central area of the diaphragm in the housing and is moved in a direction orthogonal to the pressure receiving face in conjunction with the diaphragm; and a pressure sensitive element that is connected to the force transmitting unit and the housing and has a detection axis set along an axis orthogonal to the pressure receiving face of the diaphragm. The pressure sensitive element has base portions which are respectively bonded to the force transmitting unit and the housing by an inorganic adhesive.

With the above configuration, adhesive layers are respectively formed between the pressure sensitive element and the housing and between the pressure sensitive element and the force transmitting unit. A pressure received by the diaphragm is applied to the pressure sensitive element as a compressive force or a tensile force via the force transmitting unit. At that time, a shear stress is applied to each adhesive layer in a direction parallel to the adhering face of each adhesive layer, or a compressive or tensile force is applied to each adhesive layer in a thickness direction of each adhesive layer. Accordingly, since the adhesive layer is formed to be rigid, the shear stress or the compressive or tensile force is not absorbed nor alleviated by the adhesive layer and is surely transmitted to the pressure sensitive element. As a result, it is possible to form the highly precise pressure sensor capable of improving accuracy of pressure detection while eliminating an error in the pressure detection.

A pressure sensor according to a third aspect of the invention includes: a housing; a pair of pressure input orifices that are coaxially provided to respective end face plates facing each other in the housing; first and second diaphragms that seal the respective pressure input orifices and have respective outer faces as pressure receiving faces; a force transmitting unit connecting central areas of inner faces of the diaphragms with each other inside the housing; and a pressure sensitive element that has one end connected to the force transmitting unit at an intermediate portion and the other end connected to the housing and is disposed such that its detection axis is parallel to an axis orthogonal to the pressure receiving face of the diaphragm. The pressure sensitive element has base portions that are respectively bonded to the force transmitting unit and the housing by an inorganic adhesive.

With the above configuration, adhesive layers are respectively formed between the pressure sensitive element and the housing and between the pressure sensitive element and the force transmitting unit by the inorganic adhesive. The pressure received by the diaphragm is applied to the pressure sensitive element as a compressive force or a tensile force. At that time, a shear stress is applied to the adhesive layer in a direction parallel to the adhering face of the adhesive layer. Accordingly, since the adhesive layer is formed to be rigid by virtue of the inorganic adhesive, the shear stress is not absorbed nor alleviated and is surely transmitted to the pressure sensitive element. As a result, it is possible to form the highly precise pressure sensor capable of improving accuracy of pressure detection while eliminating an error in the pressure detection.

A pressure sensor according to a fourth aspect of the invention includes: a housing; a pressure input orifice provided to an end face plate of the housing; a diaphragm that seals the pressure input orifice and has an outer face as a pressure receiving face; a force transmitting unit that is provided at a central area on an inner face of the diaphragm inside the housing so as to be disposed on an axis orthogonal to the pressure receiving face of the diaphragm and is connected to the end face plate of the housing; and a pressure sensitive element that has one end connected to the force transmitting unit at an intermediate area and the other end connected to the housing and is disposed such that a detection axis is coaxial with an axis orthogonal to the pressure receiving face of the diaphragm. The pressure sensitive element has base portions at the ends that are respectively bonded to the force transmitting unit and the housing by an inorganic adhesive.

With the above configuration, adhesive layers are respectively formed between the pressure sensitive element and the housing and between the pressure sensitive element and the force transmitting unit by the inorganic adhesive. The pressure received by the diaphragm is applied to the pressure sensitive element as a compressive force or a tensile force. At that time, a compressive or tensile force is applied to the adhesive layer in a thickness direction of the adhesive layer. Accordingly, since the adhesive layer is formed to be rigid by virtue of the inorganic adhesive, the shear stress is not absorbed or alleviated by the adhesive layer and is surely transmitted to the pressure sensitive element. As a result, it is possible to form the highly precise pressure sensor capable of improving accuracy of pressure detection while eliminating an error in the pressure detection.

In the pressure sensor according to the second aspect of the invention, a support pole is preferably provided inside of the housing so as to be parallel to the detection axis. With the above configuration, since only a force in a direction of the detection axis can be applied to the pressure sensitive element, the detection accuracy can be improved.

In the pressure sensor according to the second aspect of the invention, the force transmitting unit is preferably formed of a center shaft and the pressure sensitive element is disposed parallel to the center shaft. With the above configuration, the height of the housing can be reduced so that the pressure sensor can be miniaturized.

In the pressure sensor according to the second aspect of the invention, the diaphragm is preferably fitted to a recessed part that is formed at the outer face of the end face plate of the housing, and the diaphragm is disposed to be flush with the end face plate.

With the above configuration, it is possible to obviate the need of providing a projection and the height of the housing can be reduced so that the pressure sensor can be miniaturized.

A pressure sensor according to a fifth aspect of the invention includes: a housing composed of first and second members forming opposing end face plates and a third member forming a side face member surrounding the first and second members; first and second diaphragms that respectively seal pressure input orifices formed on the respective first and second members; a center shaft that is coupled to the first and second diaphragms at those center areas to be united thereto and enables transmission of a force; a pressure sensitive element that has both ends respectively attached to a movable pedestal fixed to the center shaft and a fixing pedestal provided to the inside of the housing and has a detection axis set in parallel to the center shaft; and a plurality of support poles that are arranged at a surrounding portion of the center shaft and couples the first and second members to each other. The both ends are respectively bonded to the movable pedestal and the fixing pedestal by an inorganic adhesive.

With the above configuration, it is possible to form a small oil-less pressure sensor as a relative pressure sensor, and only a force in a direction of the detection axis can be applied to the pressure sensitive element, thereby improving the detection accuracy.

A pressure sensor according to a sixth aspect of the invention includes: a housing composed of first and second members forming opposing end face plates and a third member forming a side face member by surrounding the first and second members; a first diaphragm that seals a pressure input orifice formed on the first member; a center shaft which is coupled to the first diaphragm at its center area to be united therewith in the housing and enables transmission of a force; a pressure sensitive element that has both ends respectively attached to a movable pedestal fixed to an end of the center shaft and a fixing pedestal provided to the inner face of the second member and has a detection axis set to be coaxial with the center shaft; and a plurality of support poles that are arranged at a surrounding portion of the center shaft and couple the first and second members to each other. The both ends of the pressure sensitive element are respectively bonded to the movable pedestal and the fixing pedestal by an inorganic adhesive.

With the above configuration, it is possible to form a small oil-less pressure sensor as an absolute pressure sensor, and only a force in a direction of the detection axis can be applied to the pressure sensitive element, thereby improving the detection accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

The preferred embodiments of the pressure sensor according to the invention will be described with reference to the accompanying drawings. Note that a structural element, a kind, a combination, a shape or a relative alignment of elements, components or members in the embodiments described below is only an explanatory example of the invention and does not limit the invention unless there is a specific description.

Figure 1A:
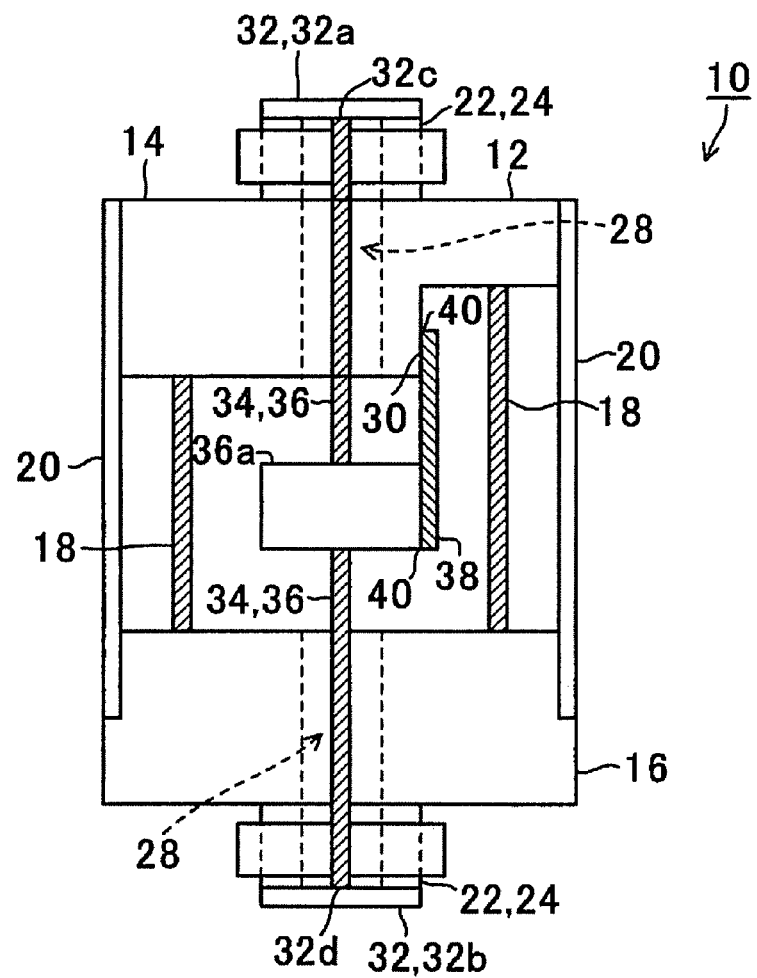
FIGS. 1A and 1B are schematic views showing a pressure sensor according to a first embodiment of the invention.
Figure 1B:
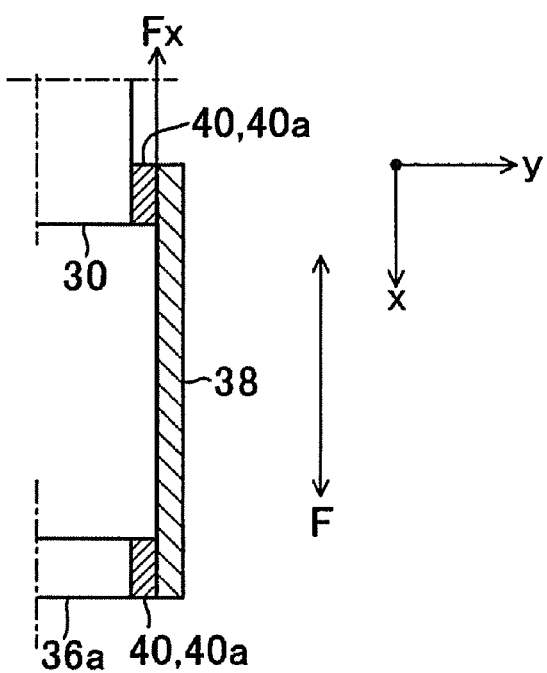

FIGS. 1A and 1B are schematic views showing a pressure sensor of a first embodiment of the invention. FIG. 1A is a schematic view illustrating the pressure sensor and FIG. 1B is a partial detail view illustrating a support structure of a pressure sensitive element 38 of the first embodiment. A pressure sensor 10 of the first embodiment has a cylindrical outer shape and is composed of a housing 12, a diaphragm 32, a center shaft 36 as a force transmitting unit 34, and the pressure sensitive element 38.

The housing 12 has a vacuum inner space and accommodates structural elements described later. With the above configuration, a Q factor of the pressure sensor 10 can be increased and stable resonance frequency can be attained so that long term stability can be achieved.

An entire outer shape of the housing 12 is constituted of a disk shaped first member 14 forming an upper end face plate, a disk shaped second member 16 forming a lower end face plate, a support pole 18 coupling the first and second members 14 and 16 to each other, and a third member 20 forming a cylindrical side wall covering side walls of the first and second members 14 and 16. The first member 14 and the second member 16 have the same diameter. Pipe sleeves 22 are provided to the respective first and second members 14 and 16 at portions forming coaxial circles to be outwardly projected, and first and second pressure input orifices 24 and 26 are opened on the respective pipe sleeves 22. A throughhole 28 passing through the first member 14 and the first pressure input orifice 24 (the second member 16 and the second pressure orifice 26) is formed at a central area of the coaxial circle.

The support pole 18 has prescribed rigidity and is provided to a portion where the first member 14 and the second member 16 face each other. A hole (not shown) having a shape the same as a cross sectional shape of the support pole 18 is formed on each of the first and second members 14 and 16 and the support pole 18 is inserted to each hole and is bonded thereto so that the rigidity between the support pole 18 and the first and second members 16 and 18 is ensured. With this configuration, it is possible to suppress unnecessary distortion applied to the pressure sensitive element 38 while the pressure sensor 10 is assembled or used. Note that while two support poles 18 are used in the embodiment, it is possible to use one support pole or three or more support poles.

It is preferable that a material of the housing 12 at a portion accommodating the support pole 18 and the pressure sensitive element 38 is metal or ceramic having a small thermal expansion coefficient in order to alleviate error of the sensor 10 due to thermal expansion.

The diaphragms 32 (first diaphragm 32a, second diaphragm 32b) bendable by pressure of a liquid or a gas to be measured are respectively attached to the first pressure input orifice 24 and the second pressure input orifice 26. The diaphragms 32 seal the respective through-holes 28 to be disclosed outside.

One face of each diaphragm 32 (first diaphragm 32a, second diaphragm 32b) faces outside to be a pressure receiving face. The pressure receiving face receives pressure to be measured from the outside and is deformed. As a result, the diaphragm 32 applies a force to an end face of the center shaft 36 as a force transmitting means 34 (described later) which is in contact with (connected to) a central part 32c or 32d at the other face of the diaphragm 32. It is preferable that a material of the diaphragm 32 is metal such as stainless or ceramic superior in corrosion resistance, or a monocrystalline material such as quartz crystal or any other amorphous materials. In addition, it is preferable that the diaphragm 32 is formed by a photolithography technique or an etching technique that does not generate a residual stress and has advantageous for miniaturizing, the residual stress being possibly generated by press processing.

Coating can be applied to a surface of each of the diaphragms disclosed outside so as no to be corroded by a liquid or a gas. When, for example, the diaphragm is made of metal, the surface is preferably coated with a compound of nickel. When the diaphragm is made of a piezoelectric crystal material such as quartz crystal, the surface is preferably coated with silicon.

The center shaft 36 as the force transmitting unit 34 is provided between the first diaphragm 32a and the second diaphragm 32b by being passed through the through-holes 28. The both ends of the center shaft 36 is bonded to the respective faces of the central part 32c of the first diaphragm 32a and the central part 32d of the second diaphragm 32b to be orthogonal to the respective faces. As a result, when a pressure is applied to the diaphragm 32, a displacement direction of the center shaft 36 is the same as that of the first diaphragm 32a or the second diaphragm 32b. At that time, the diaphragm 32 receiving the higher pressure is displaced inward and the diaphragm 32 receiving the lower pressure is displaced outward. However, since the length of the center shaft 36 is not varied, absolute values of the displacement at both sides are the same. Further, the movable member 36a is fixed to the center shaft 36 at a prescribed position. A displacement direction of the movable member 36a is the same as that of the center shaft 36.

By selecting the material of the center shaft 36 from stainless and aluminum whose strength is stable and ceramic capable of being easily machined depending on the use of the pressure sensor 10, it is possible to form the stable pressure sensor 10 with high accuracy. In particular, when the center shaft 36 is made of a material having a small thermal expansion coefficient such as metal or ceramic, a temperature characteristic of the pressure sensor 10 mostly depends on that of the pressure sensitive element. Further, it is desirable that each of both ends of the center shaft 36 is made in a circle, and the centers of both of the ends are coincident with the respective centers (centers of the central parts 32c and 32d) of the diaphragms 32 to be connected thereto.

The pressure sensitive element 38 is formed as a double-ended tuning fork resonator, a SAW resonator or a thickness-shear vibrator by using a piezoelectric material such as quartz crystal, lithium niobate, or lithium tantalate. The pressure sensitive element 38 is supported such that both ends of the pressure sensitive element 38 are respectively connected to the movable member 36a and a fixing member 30 of the first member 14. The pressure sensitive element 38 is configured such that a detection direction of a force is set to a detection axis. A direction of a line passing through the both ends of the pressure sensitive element 38 is parallel to the detection axis. The pressure sensitive element 38 is electrically connected to an oscillation circuit (not shown) attached to the housing 12 and oscillates in an inherent resonant frequency by an alternating current (AC) voltage generated by the oscillation circuit (not shown).

When the pressure sensitive element 38 receives a tensile (stretching) stress or a compressive stress from the movable member 38a, the resonant frequency is varied. In particular, a magnitude of variation of a resonant frequency with respect to a tensile or compressive stress of the double-ended tuning fork resonator is markedly great as compared to that of the thickness-shear vibrator and the variable range of the resonant frequency is large. As a result, the double-ended tuning fork resonator is suitable for a pressure sensor 10 having high resolution capable of detecting a slight pressure difference. When the double-ended tuning fork resonator receives a tensile stress, amplitude of an oscillation arm (oscillation part) is decreased so that the resonant frequency is increased. When it receives a compressive stress, the amplitude of the oscillation arm (oscillation part) is increased so that the resonant frequency is decreased. Quartz crystal has an excellent temperature characteristic so that it is preferable to use quartz crystal for a piezoelectric substrate of the double-ended tuning fork resonator.

In the pressure sensor 10 constituted as above, an outer peripheral of the pipe sleeve 22 is made to be, for example, a male screw as shown in FIG. 1. The pressure sensor 10 may be attached to a container of a liquid or a gas as a pressure measurement object by using an attachment clamp 42 made to be a female screw fittable to the male screw, and one of the diaphragms 32 may be directly brought into contact with the measurement object. The attachment fitting 42 requires a prescribed shape or a thickness depending on a magnitude of the pressure of the liquid to be measured or a structure of the container.

As described above, since the pressure sensor 10 of the first embodiment does not use oil as a structural component, a problem of leakage of the oil does not occur. Since the force transmitting unit 34 applies its force to the pressure sensitive element 38 only from the direction of the end face of the pressure sensitive element 38, it is possible to improve the sensitivity of the pressure sensor 10.

However, while the sensitivity of the pressure sensor 10 was improved, an inherent problem as described later was highlighted. As shown in FIG. 1B, the pressure sensitive element 38 is supported such that both ends of the pressure sensitive element 38 are respectively connected to the movable member 36a and the fixing member 30 with respective adhesive layers 40a therebetween. In the early stage, the inventor of the present invention carried out testing of supporting and fixing of the pressure sensitive element 38 by using an epoxy type or silicon type resin adhesive which is generally used in the pressure sensor described in the first to third examples of the related art.

Figure 2A:
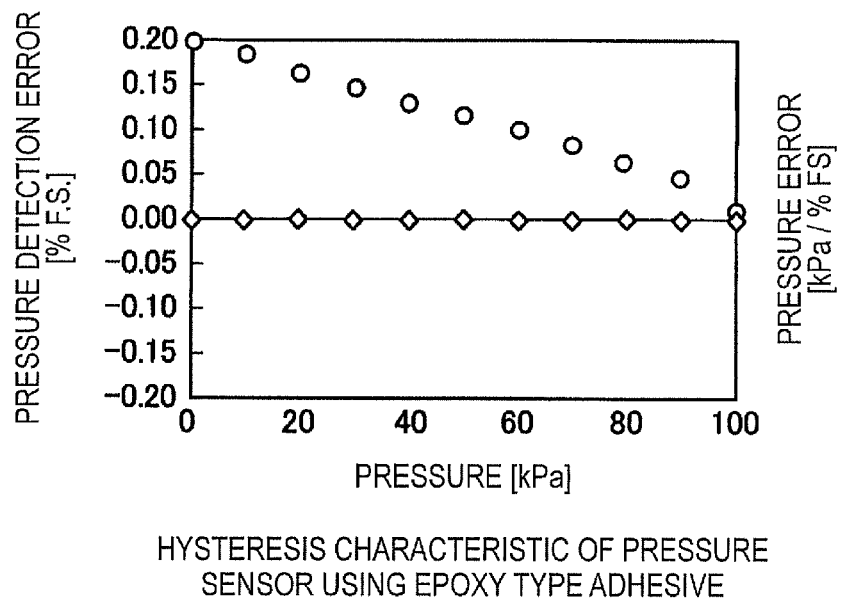
FIGS. 2A and 2B are graphs showing hysteresis characteristics of the pressure sensors.

FIG. 2A is a graph showing a hysteresis characteristic of the pressure sensor 10 in a case where an epoxy type adhesive is used. The first pressure input orifice 24 of the pressure sensor 10 was installed in an atmospheric air and a pressure applied to the first diaphragm 32a was referred to as an atmospheric air pressure level (1 atm=101325 Pa≈101.3 kPa). The second pressure input orifice 26 was dipped in a liquid as a pressure measurement object and the pressure applied to the second diaphragm 32b was set in a level of 101.3 kPa. A level obtained by a pressure difference between pressures applied to the first diaphragm 32a and the second diaphragm 32b was made to be zero, i.e., referred to as a reference. FIG. 2A is the graph made by plotting values of full scales (F. S.) obtained such that first detection errors and second detection errors were divided by 100 kPa, the first detection errors being between pressure values detected by the pressure sensitive element 38 and the above pressure difference while applying the pressure to the second diaphragm 32b of the second input orifice 26 by increasing the pressure from a state of the pressure difference value of 0 Pa to a state of that of 100 kPa, and the second detection errors being between pressure values detected by the pressure sensitive element 38 and the above pressure difference while applying the pressure to the second diaphragm 32b of the second input orifice 26 by decreasing from a state of the pressure difference value of 100 kPa to a state of that of 0 Pa after the pressure difference reached the value of 100 Pa.

In a case where the epoxy type adhesive was used, while the pressure was increased, the detection error was not observed. Contrary to the above, it was observed that the more the pressure difference was reduced from 100 kPa, the more the detection error was increased so that it was revealed that the pressure sensor using the epoxy type adhesive has a hysteresis characteristic.

It is because that as shown in FIG. 1B, when the detection axis direction is referred to as x axis and the thickness direction of the adhesive layer 40a is referred to as y axis, a pressure received by the diaphragm 32 is applied to the pressure sensitive element 38 as a compressive force or a tensile force F via the center shaft 36 and the movable member 36a, and at that time, the force F is applied to the adhesive layer 40a in a direction parallel to the x axis (direction parallel to the adhering face of the adhesive layer 40a) so that the force F acts as a shear force to generate a shear stress on the adhesive layer 40a. On the other hand, it is possible to understand that since the adhesive layer 40a is formed of a soft epoxy type resin adhesive having a visco-elastically deformable characteristic, the adhesive layer 40a absorbs and alleviates the shear stress so that a problem that the sensitivity of the pressure sensitive element 38 is degraded by a degree of the elasticity of the adhesive may occur.

Figure 8A:
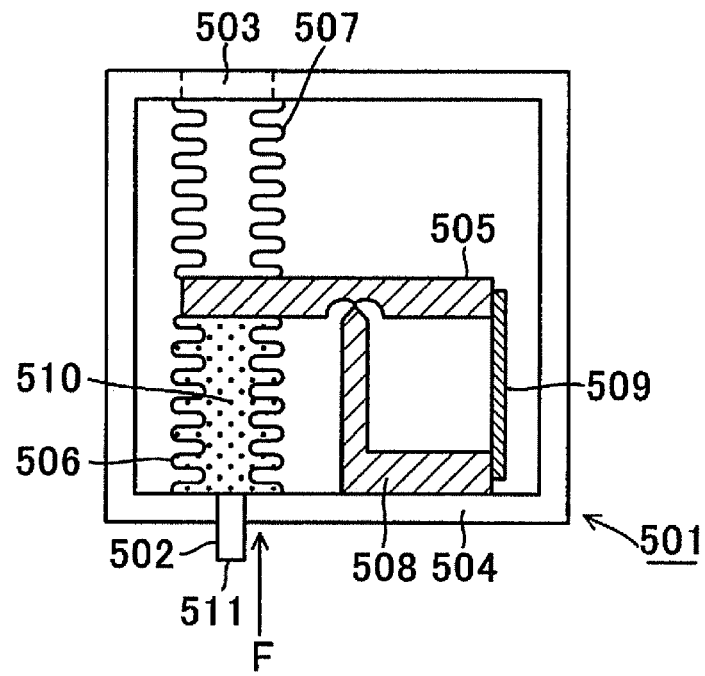
FIGS. 8A and 8B are schematic views typically showing an existing pressure sensor.
Figure 8B:
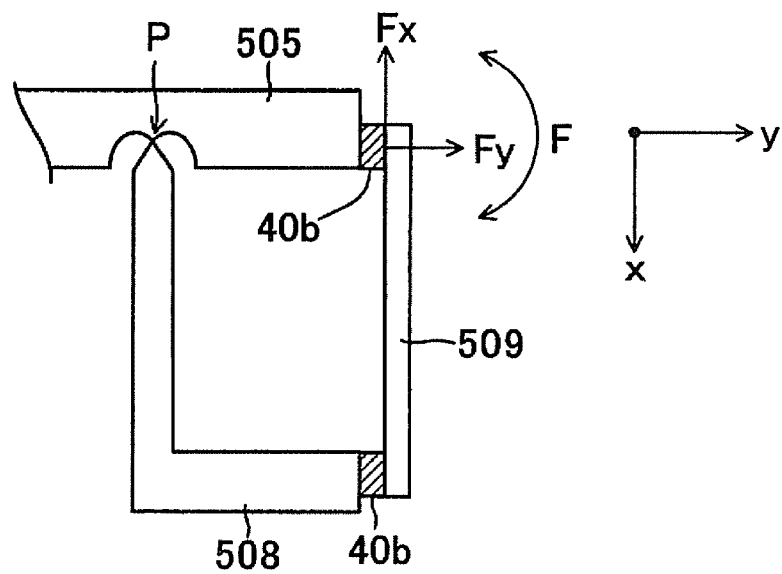

Contrarily to the above, in the existing structure shown in FIGS. 8A, 8B, while a pressure received by the bellows 506 is transmitted to the pressure sensitive element 509 via the transmitting member 505 as a force F, the force F acts on the adhesive layer 40b in a direction of plotting a circle about a rotational axis in a direction orthogonal to a paper surface with respect to the pivot P as a fulcrum so that the force F is divided into a component in the x axis direction and a component in the y axis direction. A force Fx applying in a direction parallel to the x axis acts as a shear force and a force Fy applying in a direction parallel to the y axis acts as a compressive (or tensile) force. Therefore, the shear stress and the compressive stress (or tensile stress) are generated on the adhesive layer 40b. At that time, as described above, the shear stress is absorbed and alleviated by being affected by the visco-elastically deformation of the resin adhesive of the adhesive layer 40b. However, since the adhesive layer 40b is sandwiched between the pressure sensitive element 509 and the force transmitting member 505, the adhesive layer 40b is hardly visco-elastically deformed in the thickness direction of the adhesive layer 40b. As a result, the compressive stress (or tensile stress) is directly transmitted to the pressure sensitive element 509 so that it is possible to estimate that degradation of the sensitivity to a degree influencing the detection of the pressure was not induced as much as compared to the case of the structure shown in FIGS. 1A and 1B.

The inventor of the invention thought that regarding the pressure sensor 10 having the structure shown in FIG. 1, fixing of the pressure sensitive element 38 in a rigid manner was suitable for forming the adhesive layer 40a so as to support and fix the pressure sensitive element 38, and for this reason, adoption of an inorganic adhesive might solve the above described problem.

The inventor repeated simulation and examination, and revealed that an adhesive including aluminum oxide and a Si compound is preferable for the inorganic adhesive 40. In particular, the following materials by product names are preferable. They are ThreeBondo3732 (an inorganic adhesive including as main components aluminum oxide and organ polysiloxane condensate) made of Threebond Co. Ltd., Alon ceramic C, D (an inorganic adhesive including as main components aluminum oxide, silicate, silica sand inorganic aggregate and water) made of TOAGOSEI CO., LTD., Betack 820NF(W), 840A, 900C (an inorganic adhesive including, as main components, sodium silicate, aluminum oxide, and silicon dioxide) and Betack 1800 LB (an inorganic adhesive including, as main components, aluminum primary phosphate, silicon dioxide, and aqueous suspension having an inorganic pigment) made of Telnik Industrial Co., Ltd., Ceramabond 503 (an inorganic adhesive including, as main components, aluminum oxide, aluminum primary phosphate and water), Ceramabond 552 (an inorganic adhesive including, as main components, alumina and silicate), Ceramabond 569 (an inorganic adhesive including, as main components, aluminum oxide and potassium silicate), Ceramabond 571 (an inorganic adhesive including, as main components, sodium metasilicate), and Ceramabond 671 (an inorganic adhesive including, as main components, magnesium oxide and alumina) made of Aremco Products, Inc. (Importer: Audec Co., Ltd), and Ultra-Temp (an inorganic adhesive including, as main components, zirconia, zirconium silicate and silicate) made of Aremco Products, Inc. (Importer: Audec Co., Ltd). Note that some of the product names and company names are trademarks or registered trademarks of their respective holders.

Figure 2B:
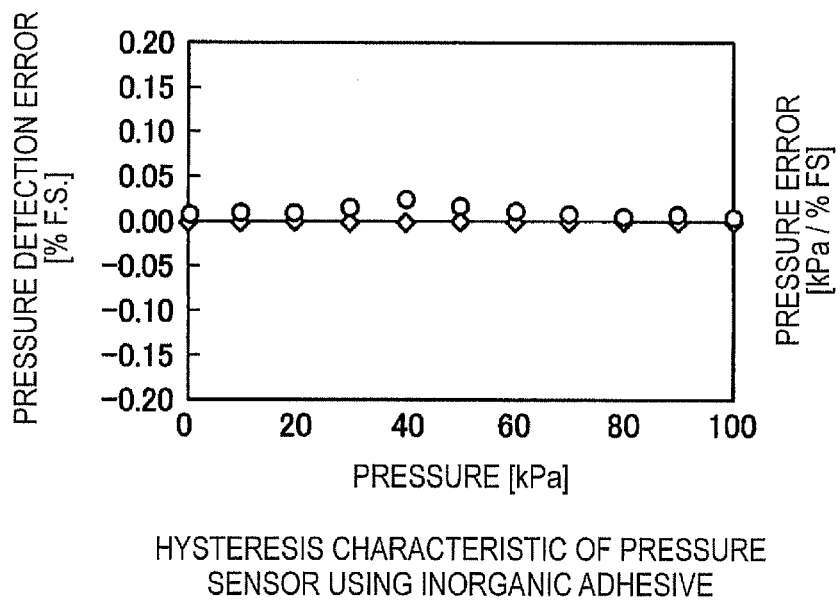

Each of thermal expansion coefficients of the above inorganic adhesives 40 is approximately the same as that of a piezoelectric element such as a quartz crystal element so that it is possible to form the pressure sensor 10 having an excellent temperature characteristic by using any of the inorganic adhesives 40. FIG. 2B is a graph showing a hysteresis characteristic with respect to the sensitivity of the pressure detection by the pressure sensor 10 using the inorganic adhesive 40. As the above, when using the inorganic adhesive, detection errors were not observed during a process of increasing the pressure and a process of decreasing the pressure from 100 kPa so that it was confirmed that the hysteresis characteristic was markedly improved. Namely, it was revealed that even when a shear force was generated on the adhesive layer 40a in the direction of the x axis, the shear force was not absorbed nor alleviated to be surely transmitted to the pressure sensitive element 38 as the compressive force (or tensile force).

In a case where shear stress is applied to the adhesive layer which is formed between the pressure sensitive element and any other member as in the embodiment, the hysteresis characteristic is eliminated by using the inorganic adhesive so that an error difference in pressure detection of the pressure sensor can be suppressed. In particular, the error difference in a low pressure region (slight pressure variation) can be markedly suppressed. As a result, it is possible to provide the pressure sensor with extremely high accuracy.

Figure 3:
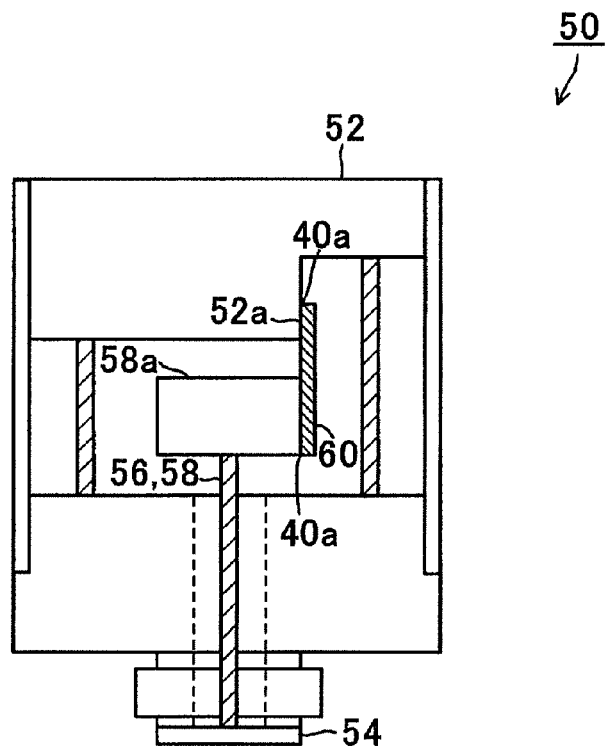
FIG. 3 is a schematic view showing a pressure sensor according to a second embodiment of the invention.

FIG. 3 is a schematic view showing a pressure sensor 50 according to a second embodiment. While the pressure sensor 10 according to the first embodiment is adapted to measure a gauge pressure represented by using the atmospheric pressure as a reference of zero, the pressure sensor 50 according to the second embodiment is adapted to measure an absolute pressure represented by using a vacuum condition as a reference of zero. For this reason, the pressure sensor 50 comprises a single diaphragm 54 connected to a housing 52, a center shaft 58 as a transmitting unit 56 connected to the diaphragm 54, a movable member 58a fixed to the center shaft 58, a fixing member 52a fixed to the housing 52, and a pressure sensitive element 60 having both ends respectively connected to the movable member 58a and the fixing member 52a to be supported thereby, and the inside of the housing 52 is vacuumed and is sealed.

When the external portion is in a vacuum condition, the pressure applied to the diaphragm 54 is zero so that the diaphragm 54 is in a flat state. When the external portion has a certain pressure, the diaphragm 54 is displaced inward in the housing 52. By this displacement, the center shaft 58 and the movable member 58a are displaced, and then the compressive pressure is applied to the pressure sensitive element 60 from a direction of its end face. The structure and the material of the adhesive layer 40a are the same as those in the first embodiment so that the description is omitted.

Figure 4:
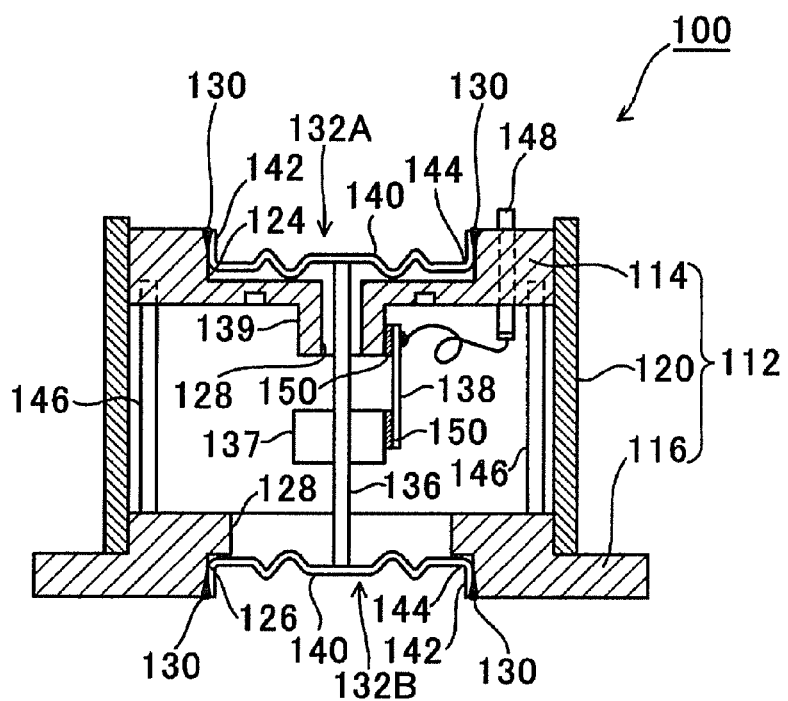
FIG. 4 is a schematic view showing a pressure sensor according to a third embodiment of the invention.
Figure 5:
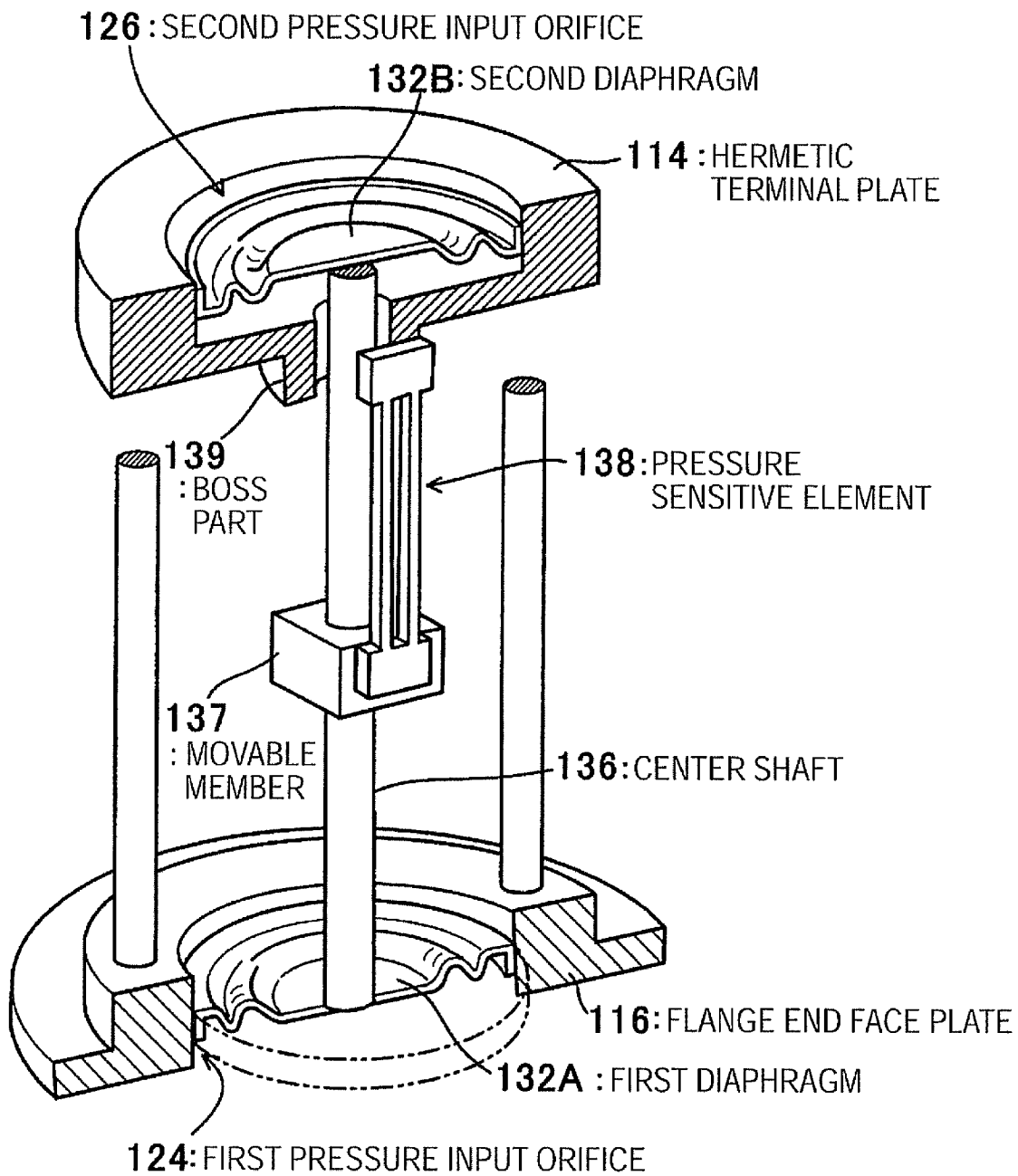
FIG. 5 is a partial perspective view showing the pressure sensor.
Figure 6:
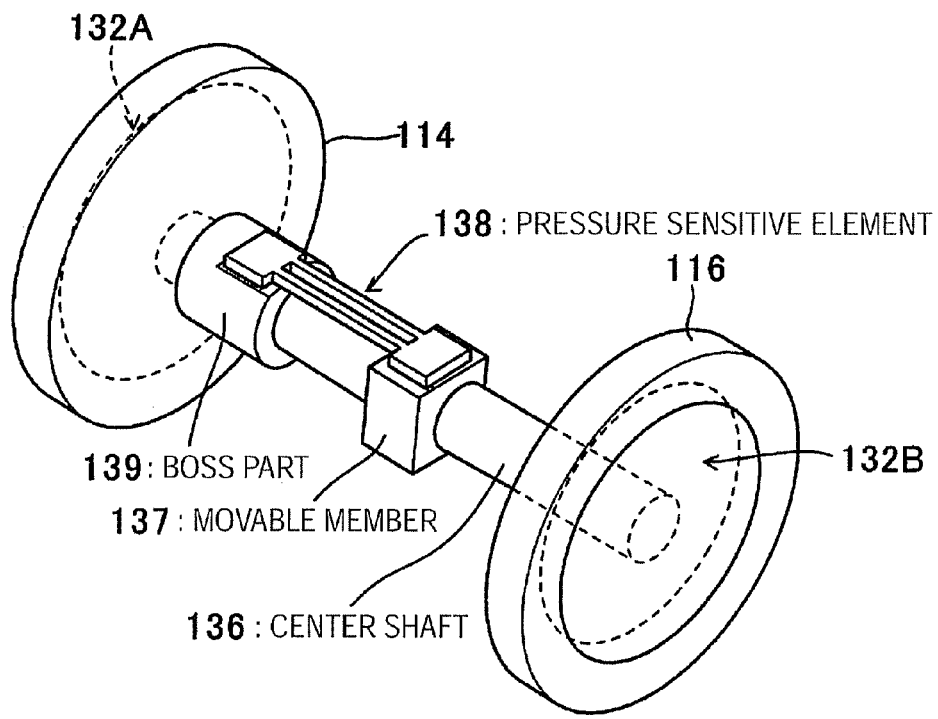
FIG. 6 is a schematic perspective view showing main components of the pressure sensor.

FIG. 4 is a schematic view showing a pressure sensor 100 according to a third embodiment. FIG. 6 is a partial, perspective, broken-out, cross-sectional view of the pressure sensor 100 of the third embodiment. FIG. 6 is a perspective view showing main components of the pressure sensor 100. The third embodiment shown in FIGS. 4 to 6 is a modification of the pressure sensor 10 (FIG. 1) for detecting a relative pressure shown in the description of the first embodiment.

The pressure sensor 100 has a sensor housing 112 that is a hollow cylindrical chassis. The housing 112 is composed of a hermetic terminal plate 114 as a first case (upper end plate), a flange end face plate 116 as a second case (lower end plate), and a cylindrical sidewall 120 as a third case surrounding the peripheries of the end plates separately disposed, thereby forming a hollow airtight container. A first pressure input orifice 124 and a second pressure input orifice 126 communicating with an inner space of the housing 112 are respectively formed on the hermetic terminal plate 114 and the flange end face plate 116 so as to form recessed parts. Through-holes 128 each being coaxial with the center of the sensor housing 112 are formed on the respective end plates so as to allow the inner space to communicate with the outside of the sensor housing 112. A first diaphragm 132A and a second diaphragm 132B are respectively fitted to the first pressure input orifice 124 and the second pressure input orifice 126. Cylindrical ends of respective peripheries of the diaphragms 132A and 132B are welded to be respectively united with the hermetic terminal plate 114 and the flange end face plate 116 (at respective bead parts 130), thereby separating the inner space from the outside. The first diaphragm 132A on the hermetic terminal plate 114 is used for setting an atmospheric pressure, and the second diaphragm 132B on the flange end face plate 116 is used for receiving a pressure. As in the case of the first embodiment, the sensor housing 112 is also closed so as to separate the inner space from the outside and the inner space is maintained to be vacuumed by an air vent unit (not shown).

A center shaft (force transmitting unit) 136 coupling central areas of the first and second diaphragms 132A and 132B at respective inner faces to each other is disposed along a core axis of the sensor housing 112 passing through the through-holes 128 and is bonded to the first and second diaphragms 132A and 132B. A movable member 137 as a pressure sensitive element pedestal is united with the center shaft 136 at its intermediate portion. One base portion of a pressure sensitive element 138 constituted of a double-ended tuning fork resonator is attached to the movable member 137 such that a detection axis is set to be parallel to an axis orthogonal to pressure receiving faces of the first and second diaphragms 132 (132A and 132B). The other base portion of the pressure sensitive element 138 is connected to a boss part 139 serving as pressure sensitive element pedestal protruding to the inside provided on the hermetic terminal plate 114 of the sensor housing 112. With the above configuration, when the center shaft 136 is moved in the axis direction by pressure difference between pressures applied to the second diaphragm 132B for receiving a pressure and the first diaphragm 132A for receiving an atmospheric pressure, the movable member 137 is displaced by the above movement so that the force generates an action force in the direction of the detection axis on the pressure sensitive element 138.

Each of the diaphragms 132 (132A and 132B) is composed of a disk shaped diaphragm body (central part) 140 capable of deforming by receiving an external force and a cylindrical part 142 capable of being fitted to an inner wall face of each of the pressure input orifices 124 and 126 at the sensor housing 112 united with the peripherals of the diaphragm bodies 140. A step wall is formed between the welded part (bead part) 130 and an outer peripheral part 144 of the diaphragm body serving as a bending basic point of the diaphragm body 140, the welded part 130 being disposed at an edge of the cylindrical part 142 and the center housing 112. In particular, in the embodiment, each of the welded parts (bead part) 130 is formed to be a cylinder part tip end portion contacting each of opening edge part of each of the pressure input orifices 124 and 126 on the sensor housing 112, and the cylinder part tip end portions are welded to the respective opening edge of the sensor housing 112.

A plurality of support poles 146 are provided to the inside of the housing 112 so as to be parallel to the center shaft 136 at the surrounding portion of the center shaft 136. The support poles 146 are adapted to maintain the distance between the flange end face plate 116 as the second member and the hermetic terminal plate 114 as the first member to be constant so as to prevent deformation of the housing 112 due to an outer force and lowering of detection accuracy depending on various postures similarly to the first embodiment.

In the third embodiment, in particular, the upper end face plate is made of the hermetic terminal plate 114 and a hermetic terminal 148 is inserted to pass through the hermetic terminal plate 114 so that a signal of the pressure sensitive element 138 can be taken out.

In addition to the above configuration, in the embodiment, the pressure sensitive element 138 constituted of the double-ended tuning fork resonator is so configured that an attachment base portion at one end side is fixed to the movable member 137 and an attachment base portion at the other end side is fixed to the boss part 139 of the hermetic terminal plate 114. An inorganic adhesive including aluminum oxide and a Si compound is used for fixing the pressure sensitive element 138, and an adhering layer 150 is disposed between the base portion of the pressure sensitive element 138 and a face to be bonded. The movable member 137 is repeatedly brought close to or separated from the boss part 139 by detection of pressure so that a shear stress is applied to the adhesive layer 150 in a direction parallel to the adhering face of the adhesive layer 150. However, the adhesive layer 150 is formed to be rigid by the inorganic adhesive so that the shear stress is not absorbed nor alleviated by the adhesive layer and is surely transmitted to the pressure sensitive element 138. As a result, it is possible to form the highly precise pressure sensor capable of eliminating an error in detection of pressure. Therefore, it is possible to achieve a small oil-less pressure sensor as a relative pressure sensor and apply only a force in a direction of the detection axis to the pressure sensitive element 138, thereby improving the detection accuracy.

In accordance with the third embodiment, the pair of diaphragms 132 are coupled to each other with the center shaft 136, the movable member 137 provided to the intermediate portion of the center shaft 136 is integrally moved in the axial direction of the shaft 136 in conjunction with the movement of the diaphragm 132 (this is an action caused by a pressure difference between pressures received by the pair of diaphragms 132A and 132B) so that the movement depends on a force acting in the direction of the detection axis of the pressure sensitive element 138 as the double-ended tuning fork resonator. Therefore, it is possible to form the pressure sensor having high detection accuracy without using oil and to achieve the small structure easily assembled.

The housing 112 as the vacuumed container is constituted of the flange end face plate 116, the hermetic terminal plate 114 and the cylindrical sidewall 120. The hermetic terminal plate 114 and the first diaphragm 132A are united with each other and the flange end face plate 116 and the second diaphragm 132B are united with each other, thereby facilitating the assembling. When the pressure sensor 100 is attached to a container to be dipped into a liquid as a pressure measurement object, the flange end face plate 116 is face-bonded to the container of the liquid via an O-ring provided to surround the periphery of the second diaphragm 132B by fastening of a bolt. Since the attaching operation does not require a structure in which a pipe sleeve provided with a diaphragm coupled to a center shaft is to be screwed as in the first embodiment, it is possible to prevent a problem that a tensile force due to expansion of the center shaft is applied to the pressure sensitive element.

Regarding the third embodiment, it is possible to integrally form the center shaft 136 and the movable member 137 as a pressure sensitive element fixing pedestal by applying a cutting process to a single member. With this configuration, the movable member 137 is not vibrated nor shifted on its fixed part.

In addition, since the diaphragms 132 are fitted to the respective pressure input holes 124 and 126 respectively formed as the recessed parts that are formed at the outer faces of the hermetic terminal plate 114 and the flange end face plate 116, the housing 112 does not have a protruding portion at the outer face so that the height can be reduced and the miniaturizing can be realized.

Figure 7:
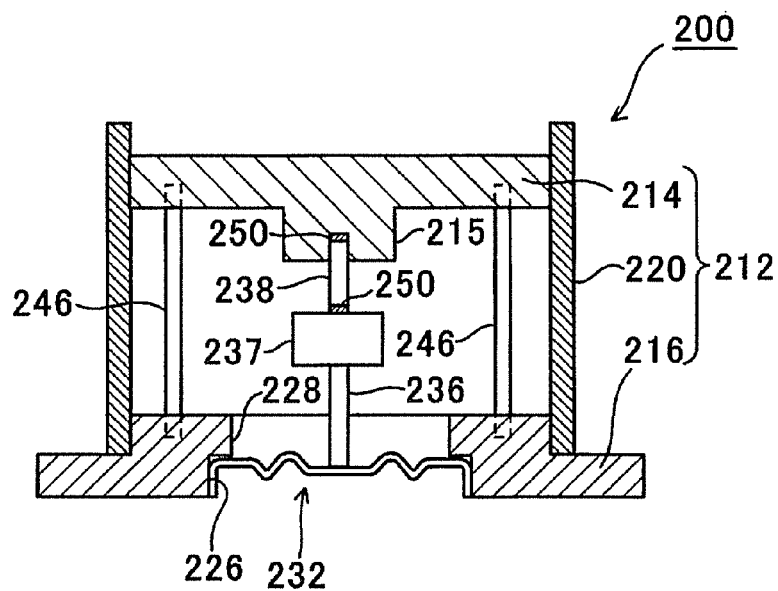
FIG. 7 is a cross sectional view of a pressure sensor according to a fourth embodiment of the pressure sensor.

FIG. 7 is a cross sectional view showing a pressure sensor 200 according to a fourth embodiment. The embodiment shown in FIG. 7 is a modification of the pressure sensor for detecting relative pressure. That is, the pressure sensor 200 is so constituted that the first diaphragm 132A for detecting an atmospheric air pressure in the third embodiment is removed, only a first member is set to a hermetic terminal plate 214, and a housing 212 is sealed. In particular, a center shaft 236 and a pressure sensitive element 238 are coaxially arranged, and they are provided on an axis passing through a center area of a diaphragm 232 for receiving a pressure, which is different from the former embodiments.

The pressure sensor 200 has the housing 212 formed of a hollow cylindrical chassis. The housing 212 is composed of the hermetic terminal plate 214 as a first member (upper end face plate), a flange end face plate 216 forming a second member (lower end face plate) similarly to the third embodiment, and a cylindrical sidewall 220 as a third case surrounding the end face plates separately disposed so as to form a hollow airtight container. A pressure input orifice 226 communicating with the inner space is formed on the flange end face plate 216 so as to pass through the flange end face plate 216 to be coaxial with the axis of the housing 212 and to form a recessed part. A through-hole 228 is formed on a center area of the recessed part. A diaphragm 232 is fitted to the recessed part, thereby separating the inner space from the outside. The diaphragm 232 is bonded to an inner wall of the recessed part of the pressure input orifice 226 to be united with the pressure input orifice 226. The diaphragm 232 is adapted to receive a pressure of a liquid as a pressure measurement object. A pressure input orifice and a diaphragm are not formed on the hermetic terminal plate 214 to be an end face plate. The above housing 212 is also formed so as to separate the inner space from the outside and the internal space is maintained to be vacuumed by an air vent unit (not shown) similarly to any other embodiments.

In the housing 212, a center shaft (force transmitting unit) 236 is provided to a center area 240 of the inner face of the diaphragm 232 and is disposed orthogonal to the center area 240 along the axis of the housing 212. A movable member 237 as a pressure sensitive element pedestal is integrally formed on a tip portion of the center shaft 236. One end of a pressure sensitive element 238 constituted of a double-ended tuning fork resonator whose detection axis is set to be coaxial with the center shaft 236, is attached to the movable member 237. The other end of the pressure sensitive element 238 is connected to a pedestal 215 protruding to the inside provided on the center area of the hermetic terminal plate 214 of the housing 112. With the above configuration, when the diaphragm 232 is bent by receiving a pressure of a liquid as a pressure measurement object, the center shaft 236 is moved in the axial direction, thereby generating an acting force in the direction of the detection axis of the pressure sensitive element 238 coupled to the movable part 237 in conjunction with the movement of the center shaft 236.

Also, in the fourth embodiment, an inorganic adhesive including aluminum oxide and a Si compound is used in order to fix the pressure sensitive element 238. Adhesive layers 250 are respectively interposed between tip portions at respective both end bases of the pressure sensitive element 238 in the detection axis direction and bonding targeted faces. With this configuration, even when the pressure sensitive element 238 receives a compressive or tensile force by an operation for pressure inspection, the compressive or tensile force is applied to the adhesive layers 250 in a direction of thickness of the adhesive layers. However, since each of the adhesive layers 250 is formed to be rigid by the inorganic adhesive, the compressive or tensile force is not absorbed nor alleviated by the adhesive layers 250 and is surely transmitted to the pressure sensitive element 238 through each adhesive layer as a rigid coupling layer. As a result, an error in the pressure detection can be eliminated and the high sensitivity can be maintained. Thus, it is possible to achieve the small oil-less pressure sensor as an absolute pressure sensor and to apply force in the detection axis to the pressure sensitive element, thereby improving the detection accuracy.

Here, a plurality of support poles 246 are provided to the inside of the housing 212 so as to be parallel to the center shaft 236 at the surrounding portion of the center shaft 246. The support poles 246 are adapted to maintain the distance between the flange end face plate 216 as the second member and the hermetic terminal plate 214 as the first member to be constant. As a result, it is possible to prevent deformation of the housing 212 due to an outer force and degradation of the detection accuracy depending on various postures of the housing 212 similarly to any other embodiments.

Also in the fourth embodiment as in the third embodiment, the upper end face plate is made of the hermetic terminal plate 214 and a hermetic terminal 248 is inserted so as to pass through the hermetic terminal plate 214 so that a signal of the pressure sensitive element 238 can be taken out.

In accordance with the fourth embodiment, the housing 212 as the vacuumed container is composed of the flange end face plate 216, the hermetic terminal plate 214 and the cylindrical sidewall 220. The flange end face plate 216 and the diaphragm 232 are united with each other, thereby facilitating the assembling. The diaphragms 232 for receiving a pressure and the center shaft 136 are coaxially coupled to each other on a straight line and the movable member 237 provided to the tip portion of the center shaft 236 is moved in the axial direction of the center shaft 236 in conjunction with the movement of the diaphragm 232 so that a force acting in the direction of the detection axis of the pressure sensitive element 238 as the double-ended tuning fork resonator is generated. As a result, it is possible to form the pressure sensor having high detection accuracy without using oil and to achieve the small structure easily assembled.

Here, regarding the fourth embodiment, it is possible to integrally form the center shaft 236 and the movable member 237 as a pressure sensitive element fixing pedestal by applying a cutting process to a single member. With this configuration, the movable member 237 is not vibrated nor shifted on its fixed part.

The entire disclosure of Japanese Patent Application Nos. 2008-153257, filed Jun. 11, 2008 and 2009-027765, filed Feb. 9, 2009 are expressly incorporated by reference herein.

What is claimed is:
1. A pressure sensor comprising:
a housing;
a pressure input orifice opened on a pipe sleeve formed on the housing;
a diaphragm that seals the pressure input orifice and has one face as a pressure receiving face;
a force transmitting unit connected to a central area of the other face of the diaphragm in the housing; and
a pressure sensitive element whose detection direction of a force is a detection axis, wherein
a displacement direction of the force transmitting unit and the detection axis are roughly orthogonal to the pressure receiving face, one end and the other end of the pressure sensitive element are respectively fixed to the housing and the force transmitting unit with an adhesive therebetween, and the adhesive is an inorganic adhesive.
2. The pressure sensor according to claim 1, wherein the inorganic adhesive includes aluminum oxide and a Si compound.
3. The pressure sensor according to claim 1, wherein the pressure sensitive element has base portions provided to its respective ends and an oscillation part disposed between the base portions.
4. A pressure sensor comprising:
a housing having a pressure input orifice;
a diaphragm that seals the pressure input orifice and has a pressure receiving face at an outer face of the diaphragm;
a force transmitting unit that is connected to a central area of the diaphragm in the housing and is moved in a direction orthogonal to the pressure receiving face in conjunction with movement of the diaphragm; and
a pressure sensitive element that is connected to the force transmitting unit and the housing and has a detection axis set along an axis orthogonal to the pressure receiving face of the diaphragm, wherein
the pressure sensitive element has a base portion which is bonded to the force transmitting unit and the housing by an inorganic adhesive.
5. The pressure sensor according to claim 4, further comprising:
a support pole that is provided inside of the housing so as to be parallel to the detection axis.
6. The pressure sensor according to claim 4, wherein the force transmitting unit is formed of a center shaft and the pressure sensitive element is disposed parallel to the center shaft.
7. The pressure sensor according to claim 4, wherein the diaphragm is fitted to a recessed part that is formed at an outer face of the end face plate of the housing, and the diaphragm is disposed to be flush with the end face plate.
8. The pressure sensor according to claim 4, wherein the inorganic adhesive includes aluminum oxide and a Si compound.
9. The pressure sensor according to claim 4, wherein the pressure sensitive element has base portions provided to its respective ends and an oscillation part disposed between the base portions.
10. A pressure sensor comprising:
a housing;
a pressure input orifice provided to an end face plate of the housing;
a diaphragm that seals the pressure input orifice and has an outer face as a pressure receiving face;
a force transmitting unit that is provided at a central area of an inner face of the diaphragm inside the housing so as to be disposed on an axis orthogonal to the pressure receiving face of the diaphragm and is connected to the end face plate of the housing facing the force transmitting unit; and
a pressure sensitive element that has one end connected to the force transmitting unit at an intermediate area and the other end connected to the housing and is disposed such that a detection axis is coaxial with an axis orthogonal to the pressure receiving face of the diaphragm, wherein
the pressure sensitive element has base portions that are respectively bonded to the force transmitting unit and the housing by an inorganic adhesive.

11. The pressure sensor according to claim 10, further comprising:
a support pole that is provided inside of the housing so as to be parallel to the detection axis.

12. The pressure sensor according to claim 10, wherein
the force transmitting unit is formed of a center shaft and the pressure sensitive element is disposed parallel to the center shaft.

13. The pressure sensor according to claim 10, wherein
the diaphragm is fitted to a recessed part that is formed at an outer face of the end face plate of the housing, and the diaphragm is disposed to be flush with the end face plate.

14. The pressure sensor according to claim 10, wherein
the inorganic adhesive includes aluminum oxide and a Si compound.

15. The pressure sensor according to claim 10, wherein
the pressure sensitive element has base portions provided to its respective ends and an oscillation part disposed between the base portions.

* * * * *